US009849862B2

(12) United States Patent
Baik et al.

(10) Patent No.: US 9,849,862 B2
(45) Date of Patent: Dec. 26, 2017

(54) WASHER LIQUID HEATING APPARATUS INTEGRATED INTO WASHER RESERVOIR

(71) Applicants: Hyundai Motor Company, Seoul (KR); Kia Motors Corporation, Seoul (KR); Denso Korea Automotive Corporation, Changwon-si (KR)

(72) Inventors: Seung Kil Baik, Gunpo-si (KR); Sang Heon Wang, Busan (KR); Seok Cheon Kang, Eunha-myeon (KR)

(73) Assignees: Hyundai Motor Company, Seoul (KR); Kia Motors Corporation, Seoul (KR); Denso Korea Automotive Corporation, Changwon-si (KR)

( * ) Notice: Subject to any disclaimer, the term of this patent is extended or adjusted under 35 U.S.C. 154(b) by 107 days.

(21) Appl. No.: 14/570,201

(22) Filed: Dec. 15, 2014

(65) Prior Publication Data

US 2016/0031420 A1 Feb. 4, 2016

(30) Foreign Application Priority Data

Jul. 29, 2014 (KR) ........................ 10-2014-0096240

(51) Int. Cl.
*B60S 1/48* (2006.01)
*H05B 3/00* (2006.01)
(Continued)

(52) U.S. Cl.
CPC ............ *B60S 1/488* (2013.01); *H05B 3/0014* (2013.01); *H05B 3/26* (2013.01); *H05B 3/82* (2013.01);
(Continued)

(58) Field of Classification Search
CPC .. B60S 1/488; B60S 1/50; F24H 1/102; F24H 1/202; F24H 9/2021; H05B 3/0014;
(Continued)

(56) References Cited

U.S. PATENT DOCUMENTS 3,888,412 A * 6/1975 Lindo ..................... B60S 1/487
137/599.14
5,118,040 A * 6/1992 Abe ....................... B60S 1/488
15/250.05
(Continued)

FOREIGN PATENT DOCUMENTS

JP 1995-022872 U 4/1995
JP 2013-10370 A 1/2013
(Continued)

*Primary Examiner* — Joseph M Pelham
(74) *Attorney, Agent, or Firm* — Morgan, Lewis & Bockius LLP

(57) ABSTRACT

A washer liquid heating apparatus integrated into a reservoir may include an auxiliary tank which is integrally connected to the reservoir and in which a washer liquid inflowing from the reservoir is stored, and a heater assembly that is integrally attached to the auxiliary tank and heats the washer liquid stored in the auxiliary tank, wherein the heater assembly comprises a plate-type heater that is installed in a hole of the auxiliary tank to heat the washer liquid within the auxiliary tank, and wherein the plate-type heater is exposed to an inside of the auxiliary tank through the hole of the auxiliary tank such that a heating surface where heating is performed heats the washer liquid within the auxiliary tank.

7 Claims, 7 Drawing Sheets

(51) Int. Cl.
*H05B 3/26* (2006.01)
*H05B 3/82* (2006.01)
*B05B 9/00* (2006.01)

(52) U.S. Cl.
CPC .............. *B05B 9/002* (2013.01); *B60S 1/482* (2013.01); *H05B 2203/011* (2013.01); *H05B 2203/014* (2013.01)

(58) Field of Classification Search
CPC ... H05B 3/28; H05B 3/82; H05B 3/04; H05B 3/00; H05B 3/84; H05B 2203/007; H05B 2203/016; H05B 2203/021; H05B 1/0202; H05B 1/0244; H05B 3/06; B60H 1/2225; A47J 31/54
USPC ........ 219/201, 202, 203; 392/441, 445, 447, 392/449–455
See application file for complete search history.

(56) References Cited

U.S. PATENT DOCUMENTS

| | | | |
|---|---|---|---|
| 6,615,438 B1* | 9/2003 | Franco | B60S 1/482 15/250.01 |
| 7,775,224 B2* | 8/2010 | Franco | B60S 1/482 134/198 |
| 2005/0047768 A1* | 3/2005 | Kuebler | B60S 1/488 392/493 |
| 2006/0102744 A1* | 5/2006 | Arkasjevski | B05B 9/002 239/128 |
| 2006/0124761 A1* | 6/2006 | Shank | B05B 9/002 239/13 |
| 2007/0284457 A1* | 12/2007 | Shank | B05B 9/002 239/135 |
| 2008/0277497 A1* | 11/2008 | Shank | B05B 9/002 239/130 |
| 2009/0283605 A1* | 11/2009 | Arkashevski | B60S 1/488 239/13 |
| 2011/0197384 A1* | 8/2011 | Grandjean | B60S 1/488 15/250.01 |
| 2012/0037606 A1* | 2/2012 | Huang | B60S 1/488 219/201 |
| 2012/0048309 A1* | 3/2012 | Pyun | B60H 1/00271 134/105 |
| 2012/0055913 A1* | 3/2012 | Huang | B60S 1/488 219/202 |
| 2012/0183281 A1* | 7/2012 | Sato | B60S 1/488 392/441 |
| 2012/0204374 A1* | 8/2012 | Shank | B05B 9/002 15/250.01 |
| 2016/0031420 A1* | 2/2016 | Baik | B60S 1/488 219/202 |

FOREIGN PATENT DOCUMENTS

| | | |
|---|---|---|
| KR | 20-1997-061923 U | 12/1997 |
| KR | 20-1998-033772 U | 9/1998 |
| KR | 20-1998-044480 U | 9/1998 |
| KR | 20-1998-045959 U | 9/1998 |
| KR | 10-0196210 B1 | 6/1999 |
| KR | 20-1999-0024374 U | 7/1999 |
| KR | 10-2001-0105736 A | 11/2001 |
| KR | 10-2003-0032067 A | 4/2003 |
| KR | 10-2007-0075129 A | 7/2007 |
| KR | 10-2012-0020950 A | 3/2012 |
| KR | 10-2012-0044643 A | 5/2012 |
| KR | 10-2014-0147574 A | 12/2014 |

* cited by examiner

WASHER LIQUID HEATING APPARATUS
INTEGRATED INTO WASHER RESERVOIR

CROSS-REFERENCE TO RELATED
APPLICATION

The present application claims priority to Korean Patent Application No. 10-2014-0096240 filed on Jul. 29, 2014, the entire contents of which is incorporated herein for all purposes by this reference.

BACKGROUND OF THE INVENTION

Field of the Invention

The present disclosure relates to a heating apparatus of washer liquid for a vehicle. More particularly, it relates to a heating apparatus of washer liquid for a vehicle through which the problems caused from viscosity increase of washer liquid, such as a decline of discharging pressure of a washer pump, a poor supply of washer liquid and a poor landing location of washer liquid, a poor cleaning of glass, damages to a washer pump and an operation switch and the like can be improved.

Description of Related Art

Generally, it is one of the most important factors to ensure a good front sight for driving safely a vehicle.

Accordingly, a wiper device is generally arranged on a vehicle to remove foreign substance attached on a surface of a wind shield glass and clean rain on a surface of the glass when it rains to ensure a front sight for a driver.

Further, an injection device of washer liquid is provided on a vehicle for injecting washer liquid onto a surface of the glass to easily remove foreign substance while a surface of a wind shield glass is cleaned.

The injection device of washer liquid is configured such that washer liquid stored in a reservoir is press-transferred by a washer pump (washer motor) and is injected onto a surface of a glass by an injection nozzle wherein the injection nozzle is generally arranged in a cowl top or a hood of a vehicle.

FIG. 1 is a view illustrating schematically an injection device of washer liquid wherein the injection device of washer liquid includes a reservoir 1 in which the washer liquid is stored, a washer pump 2 that is arranged on the reservoir 1 and press-transfers washer liquid stored in the reservoir through a washer hose 3, and a washer nozzle 4 for injecting the washer liquid that is press-transferred through the washer hose 3 onto a surface of a wind shield glass 5.

Under this configuration when a driver starts-on an operational switch (washer switch within multi-function switch), the washer pump 2 is operated to press-transfer washer liquid stored in the reservoir 1 and the press-transferred washer liquid is injected onto a surface of the glass 5 through the washer nozzle 4.

Meanwhile, the washer liquid may be frozen at a cold zone or low temperature, and further viscosity of the washer liquid is increased as temperature is decreased, wherein a poor injection of washer liquid may be made when the viscosity of washer liquid is increased.

Accordingly, as shown in FIG. 2, a heating device 6 may be arranged on an intermediate of the washer hose 3 to heat the washer liquid, wherein the conventional heating device 6 includes a housing through which the washer liquid that is press-transferred to the injection nozzle 4 through the washer pump 2 can pass.

The housing has an input port and output port at front end and rear end, to which the washer hoses 3 are connected, respectively, and through which the washer liquid is input and output, respectively, and a heater bar that is operated to heat in accordance with control signal from a controller is embedded in the housing.

As a result, the washer liquid that is press-transferred by an operation of the washer pump 2 is heated by the heat bar while it passes through inside the housing of the heating device 6 arranged on an intermediate of the washer hose 3 and then is supplied to the injection nozzle 4 through the washer house 3.

Under this configuration when a driver starts-on an operational switch, the washer pump 2 is operated and at the same time electric power is applied to the heating device 6, and the heating device 6 heats washer liquid while the washer liquid is press-transferred by the wash pump 2 so that the heated washer liquid is supplied to the injection nozzle 4 through the washer hose 3 to be injected.

However, the heating device 6 is arranged on an intermediate of the washer hose 3 while it is separated from the reservoir 1 so that the heating device is possible to heat the washer liquid that is press-transferred through the washer hose, but when a viscosity of the washer liquid stored in the reservoir 1 is increased due to condition such as temperature, etc., the washer pump 2 installed on the reservoir does not push easily the washer liquid, and thus landing location of the washer liquid becomes poor due to a decrease of a discharging pressure of the washer pump.

That is, the decrease of discharging pressure of the washer pump due to the increase of viscosity of the washer liquid and thus the poor landing location of the washer liquid and poor cleaning of a glass occur regardless of installing a heating device.

Specially, when viscosity of the washer liquid is increased, the current for operating the washer pump 2 is increased thereby to carbonize the washer pump (washer motor) and at the same time cause contact point of an operational switch (washer switch within multifunction switch) and damage thereto.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating device of washer liquid for a vehicle through which viscosity increase of washer liquid can be prevented through effective heating of washer liquid and the problems caused from viscosity increase of washer liquid can be solved.

Another object of the present invention relates to provide a heating device of washer liquid through which the problems caused from the separation of a reservoir and a heating device of washer liquid according to a related art, that is, the problems caused from viscosity increase of washer liquid within the reservoir, such as a decline of discharging pressure of a washer pump, a poor supply of washer liquid and a poor landing location of washer liquid, a poor cleaning of glass, damages to a washer pump and an operation switch and the like, can be improved.

In an aspect of the present invention, a washer liquid heating apparatus integrated into a reservoir, may include an auxiliary tank which is integrally connected to the reservoir and in which a washer liquid inflowing from the reservoir is stored, and a heater assembly that is integrally attached to the auxiliary tank and heats the washer liquid stored in the auxiliary tank, wherein the heater assembly may include a plate-type heater that is installed in a hole of the auxiliary tank to heat the washer liquid within the auxiliary tank, and wherein the plate-type heater is exposed to an inside of the auxiliary tank through the hole of the auxiliary tank such that a heating surface where heating is performed heats the washer liquid within the auxiliary tank.

The heater assembly may further include a protect cover that is assembled onto the auxiliary tank to surround the plate-type heater, and a fastening device for fixing the plate-type heater and the protect cover to the auxiliary tank.

A flange is formed to be protruded along a surrounding of the heater, which is bonded to a flange of the protect cover, and the fastening device is a bolt for fastening the bonded portion while the flange of the heater, the flange of the protect cover and a surrounding portion of the hole of the auxiliary tank are bonded.

A waterproof pad is interposed between the flange of the heater and the flange of the protect cover to be bonded, and between the flange of the heater and a surrounding portion of a hole of the reservoir to prevent leakage of the washer liquid.

The plate-type heater may include a plate-type base member, a lower insulation layer laminated on the base member, a heating body that is laminated over the lower insulation layer, an electrode for applying external electric power to the heating body, and an upper insulation layer that is laminated over the heating body and the electrode, wherein a plurality of heating bodies formed to be long over the lower insulation layer are arranged at a predetermined interval to be patterned.

The hole of the auxiliary tank to which the heater is installed is formed on a bottom or a floor of the auxiliary tank at which the washer liquid within the auxiliary tank is continuously remained.

An input port to be fitted into a hole formed on a lower part of the reservoir is formed on an upper part of the auxiliary tank, and the input port is fitted into the hole of the reservoir to be connected thereto so that the washer liquid within the reservoir inflows to the auxiliary tank and filled therein due to height and pressure differences.

A washer pump is connected to the auxiliary tank and the washer liquid stored in the auxiliary tank is inhaled by the wash pump and then press-transferred through washer hose by an injection nozzle.

The hole of the auxiliary tank to which the heater is installed is formed at a position that is lower than a position where the washer liquid is inhaled by the washer pump.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
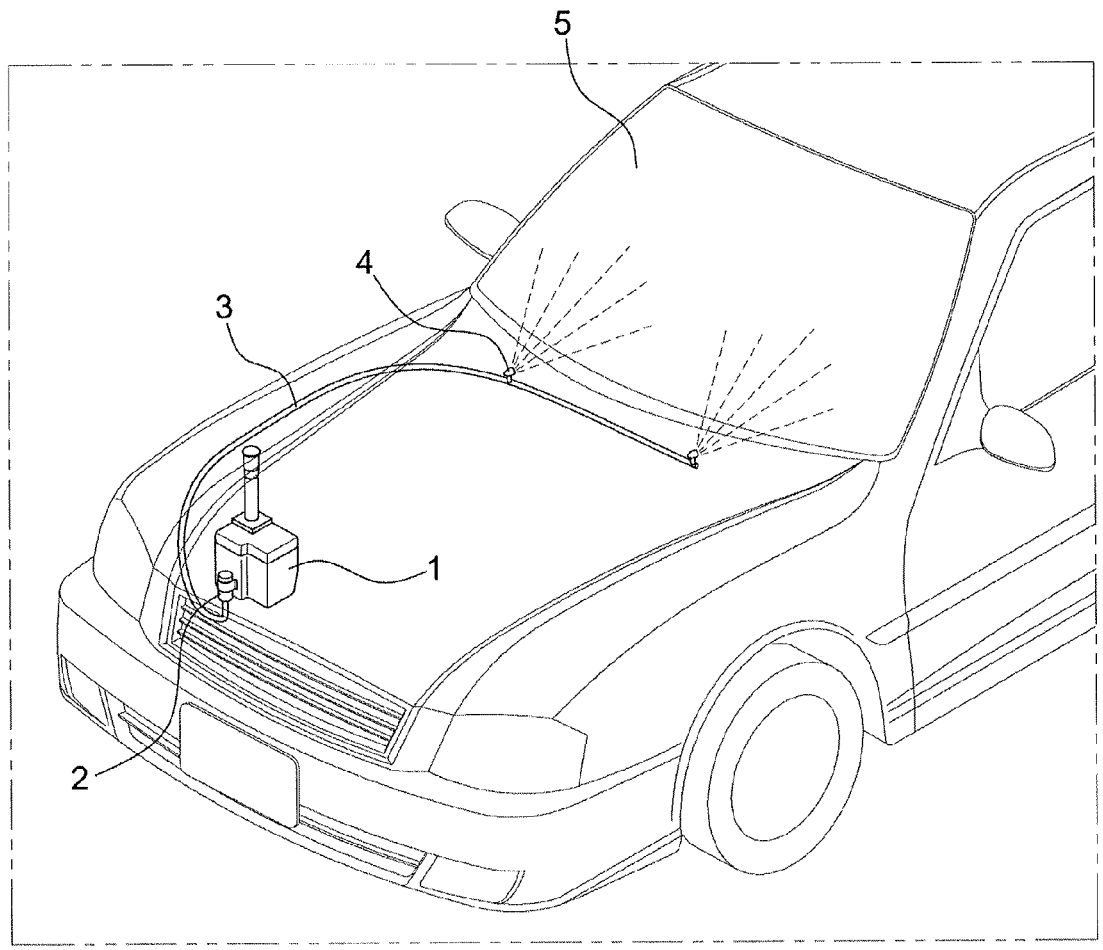
FIG. 1 is a view illustrating schematically a general injection device of washer liquid.
Figure 2:
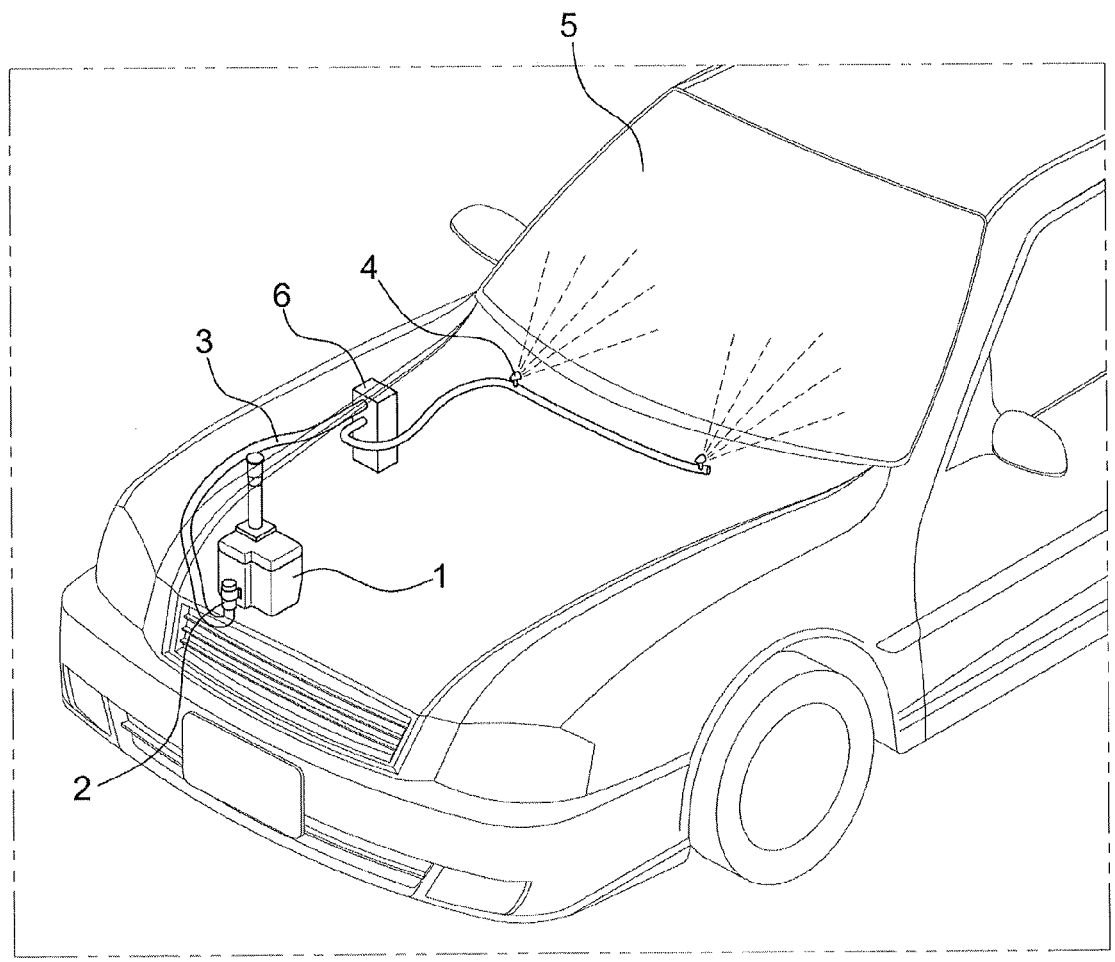
FIG. 2 is a view illustrating schematically an injection device of washer liquid having a conventional heating device.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
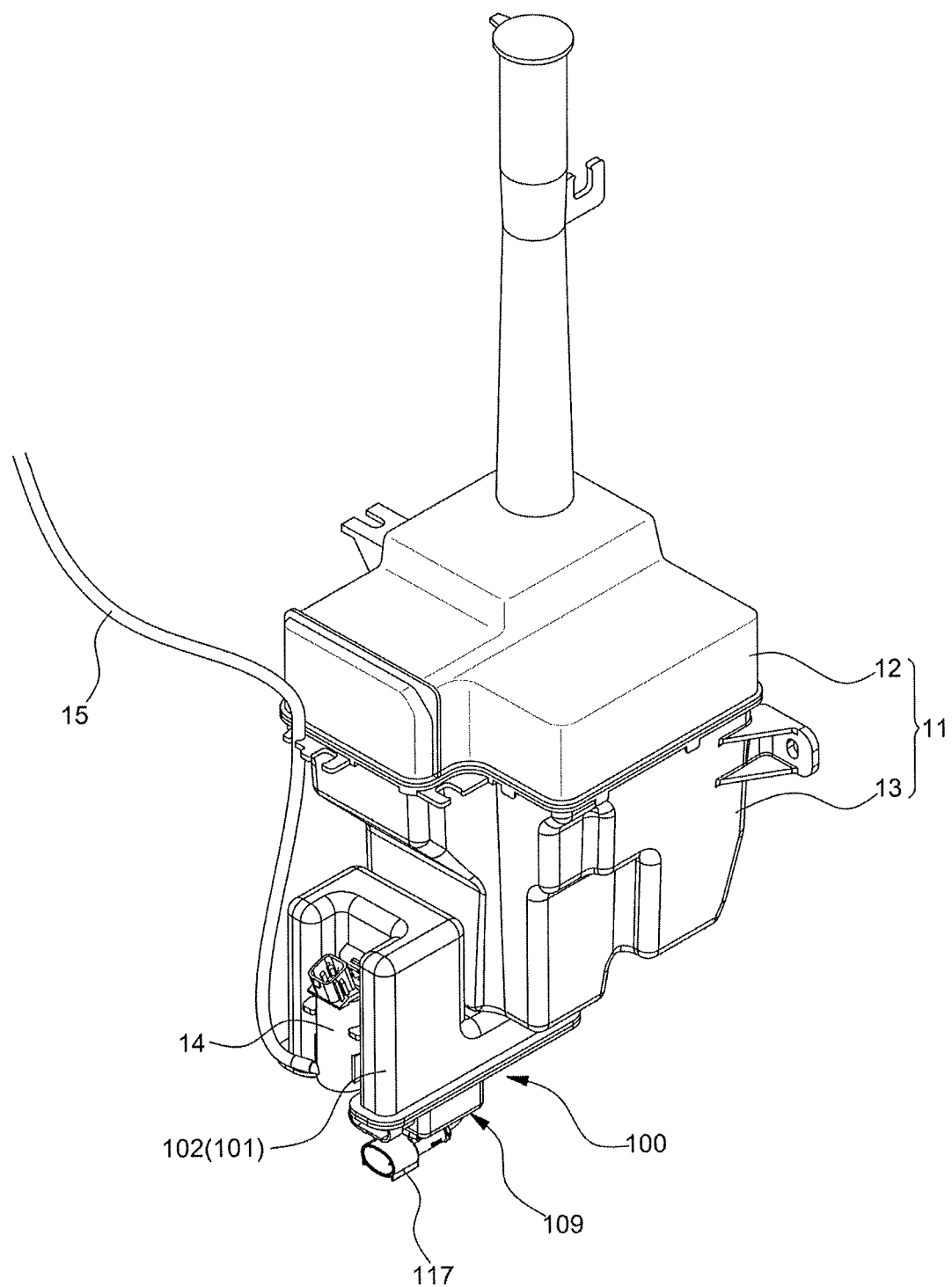
FIG. 3 is a perspective view illustrating a heating device of washer liquid integrated into a reservoir according to an exemplary embodiment of the present invention.
Figure 4:
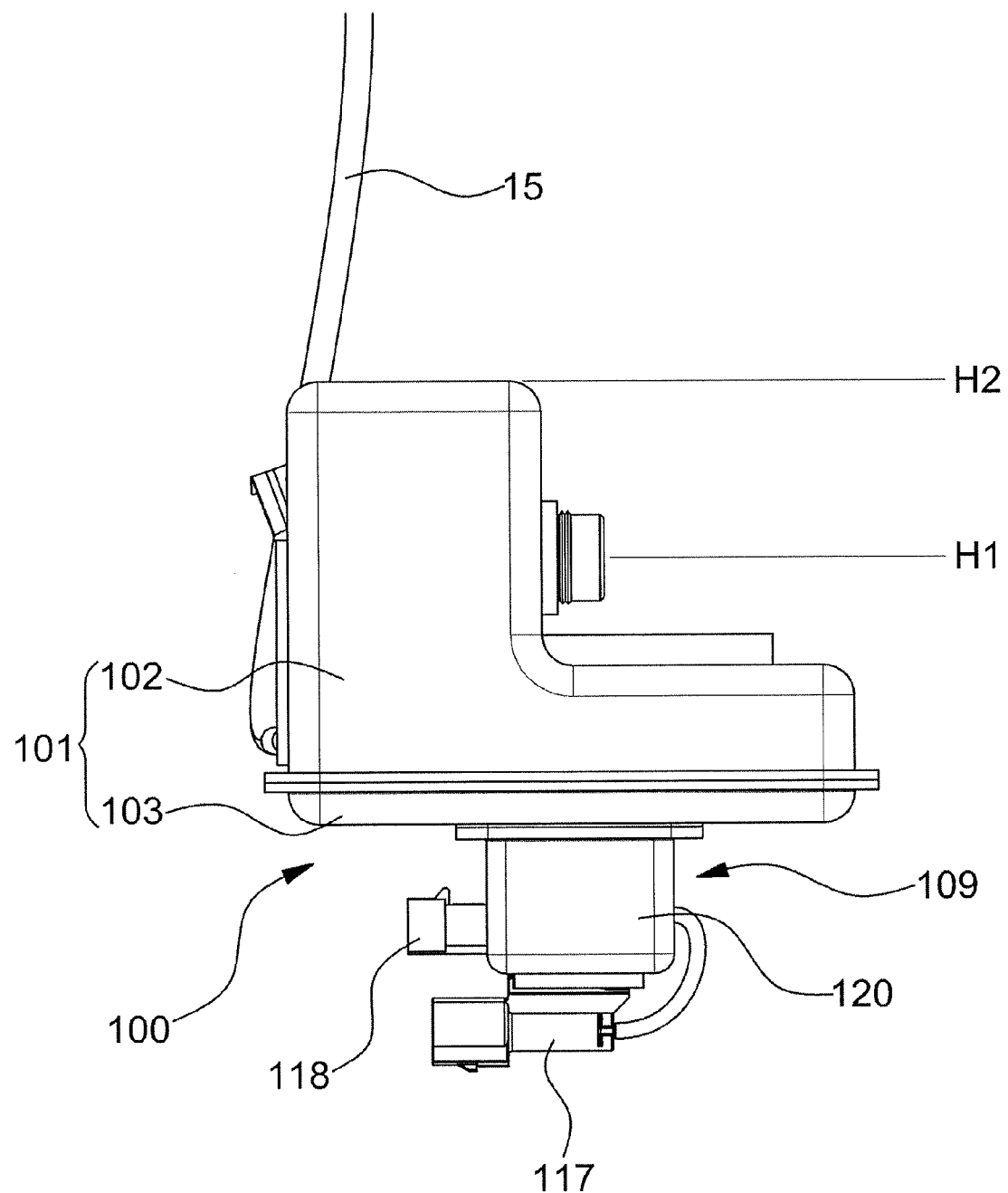
FIG. 4 is a side view illustrating a heating device of washer liquid according to an exemplary embodiment of the present invention.
Figure 5:
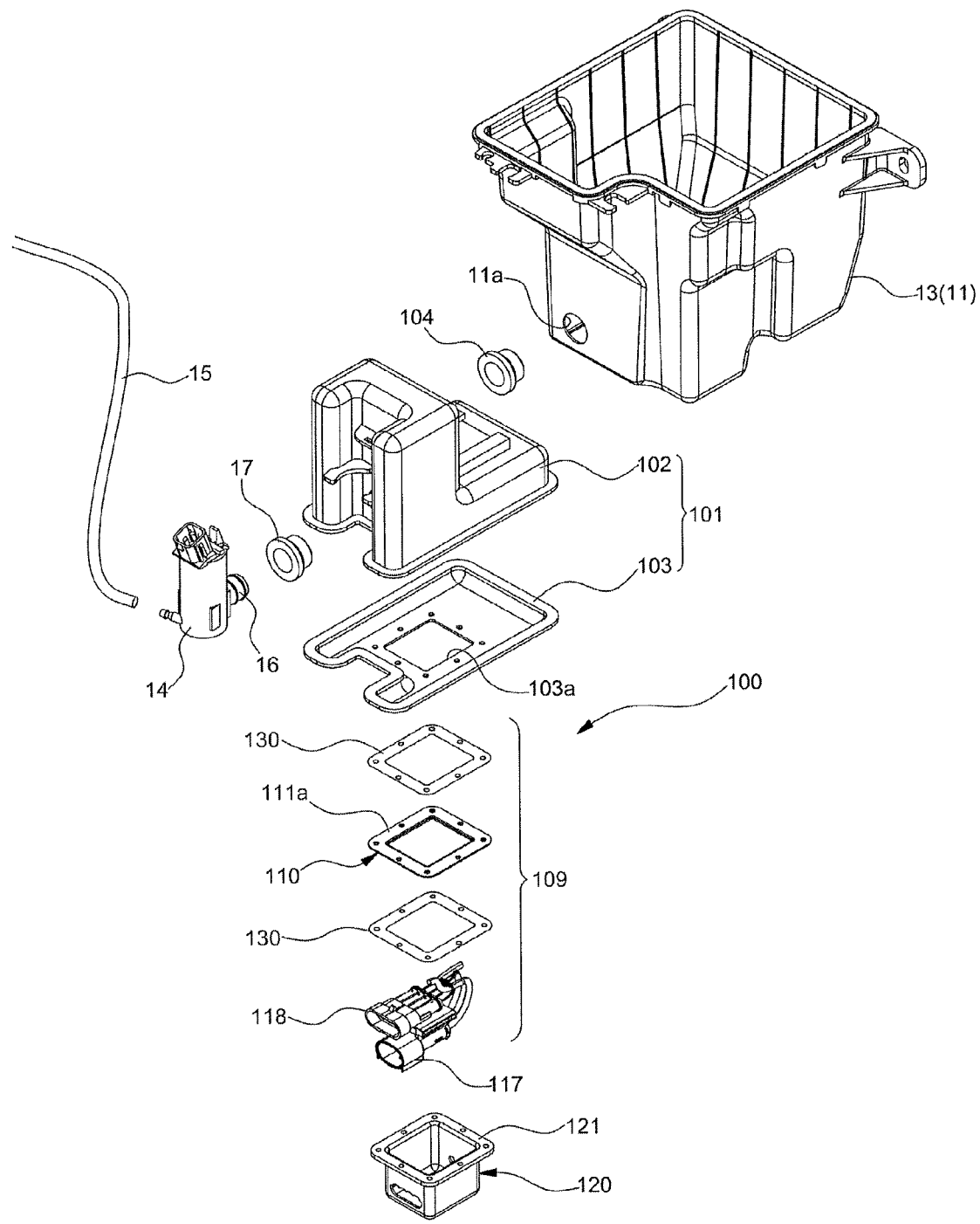
FIG. 5 is an exploded-perspective view illustrating a heating device of washer liquid according to an exemplary embodiment of the present invention.

FIG. 3 is a perspective view illustrating a heating device of washer liquid integrated into a reservoir according to an exemplary embodiment of the present invention, FIG. 4 is a side view illustrating a heating device of washer liquid according to an exemplary embodiment of the present invention, and FIG. 5 is an exploded-perspective view illustrating a heating device of washer liquid according to an exemplary embodiment of the present invention.

A reservoir 11 in which washer liquid is stored includes an upper tank 12 and a lower tank 13 separately, wherein the upper tank 12 and the lower tank 13 are assembled vertically to have a closed-inner space with a predetermined volume.

Here, only a lower tank 13 of the upper and lower tanks constituting a reservoir 11 is shown in FIG. 5 and a heating device of washer liquid 100 is installed integrally to the lower tank 13.

As shown in FIG. 5, a heating device of washer liquid 100 according to an exemplary embodiment of the present invention includes an auxiliary tank 101 which is connected to a reservoir 11 and in which washer liquid inflowing from the reservoir is stored and a heater assembly 109 that is attached integrally to the auxiliary tank 101 and heats the washer liquid stored in the auxiliary tank.

The auxiliary tank 101 may include an upper tank 102 and a lower tank 103 separately, like the reservoir, and the upper tank 102 and the lower tank 103 are assembled vertically to form the auxiliary tank 101 having a closed-inner space with a predetermined volume.

Further, a washer pump 14 for press-transferring washer liquid stored in the auxiliary tank 101 and a heater assembly 109 are installed integrally to the auxiliary tank wherein the washer pump 14 may be installed to the upper tank 102 of the auxiliary tank 101 and the heater assembly 109 may be installed to the lower tank 103 of the auxiliary tank 101.

Here, an input port is formed on an upper side of the auxiliary tank 101, which is fitted into a hole 11a formed on a lower part of the reservoir 11 (a lower part of the lower tank of the reservoir) with a grommet for waterproof 104 interposed therearound, wherein the input port of the auxiliary tank 101 is fitted into the hole 11a of the reservoir 11 to be connected so that the washer liquid within the reservoir 11 inflows into the auxiliary tank 101 to be filled therein.

At this time, a hole 11a is formed on a bottom or a floor of the lower tank 13 of the reservoir 11 and the input port of the auxiliary tank 101 is connected to the hole 11a on the bottom or the floor such that the washer liquid within the reservoir flows naturally into the auxiliary tank due to height and pressure differences even though a small amount of washer liquid remains within the reservoir 11.

Further, as shown in FIG. 4, a height H1 of the input port to be connected to the lower tank 13 of the reservoir 11 is disposed to be lower than a top height H2 of the auxiliary tank 101.

Additionally, a washer pump 14 is connected to a lower part of the auxiliary tank 101 wherein the washer pump 14 inhales washer liquid from a lower part of the auxiliary tank 101 to press-transfer it by an injection nozzle through a washer hose 15.

The washer pump 14 is connected to an output port that is formed on a lower part of the auxiliary tank 101, for example, at a lower side of the upper tank 102 constituting the auxiliary tank 101 and an intake port 16 of the washer pump 14 is fitted into the output port with a grommet 17 interposed therearound to be connected such that the washer pump 14 inhales and press-transfers washer liquid through the auxiliary tank 101.

The heater assembly 109 may be installed at a position where it can heat washer liquid regardless of the amount of washer liquid within the auxiliary tank 101, that is, at a lower part of the auxiliary tank 101, and has a plate-type heater 110 that is fixed to an inner space of the auxiliary tank 101 to be faced thereto thereby to heat directly the washer liquid within the auxiliary tank.

In an exemplary embodiment of the present invention, the heater assembly 109 may be a bottom or a floor of the auxiliary tank 101 and a hole 103a is formed on the bottom or the floor of the auxiliary tank 101 wherein the plate-type heater 110 contacts directly the washer liquid within the auxiliary tank 101 through the hole 103a.

At this time, the plate-type heater 110 is fixed and disposed to finish the hole 103a of the auxiliary tank 101, and is fixed to be exposed to the inside of the auxiliary tank through the hole 103a such that a heating surface where heating is performed heats the washer liquid within the auxiliary tank 101.

Further, even though the plate-type heater 110 is exposed inside the auxiliary tank through the hole 103a of the auxiliary tank 101, the heating needs to be performed within washer liquid to prevent overheating thereby to protect the heater 110, wherein the hole 103a of the auxiliary tank 101 to which the plate-type heater 110 is installed is formed at a position within the auxiliary tank where the washer liquid always remains even though the washer pump 14 is operated.

That is, the hole 103a of the auxiliary tank is formed on a bottom or a floor of the auxiliary tank 101, which is lower than a position where washer liquid is inhaled by the washer pump 14, and where a permanent remaining amount of washer liquid within the auxiliary tank 101 exists.

Describing the configuration of the heater assembly, it includes a plate-type heater 110 that is fixed to a hole 103a of an auxiliary tank to heat washer liquid within the auxiliary tank 101 by receiving electric power, a protect cover 120 that is assembled into the auxiliary tank 101 to surround and protect the heater 110, and a fastening device for fixing the heater 110 and the protect cover 120.

Figure 6:
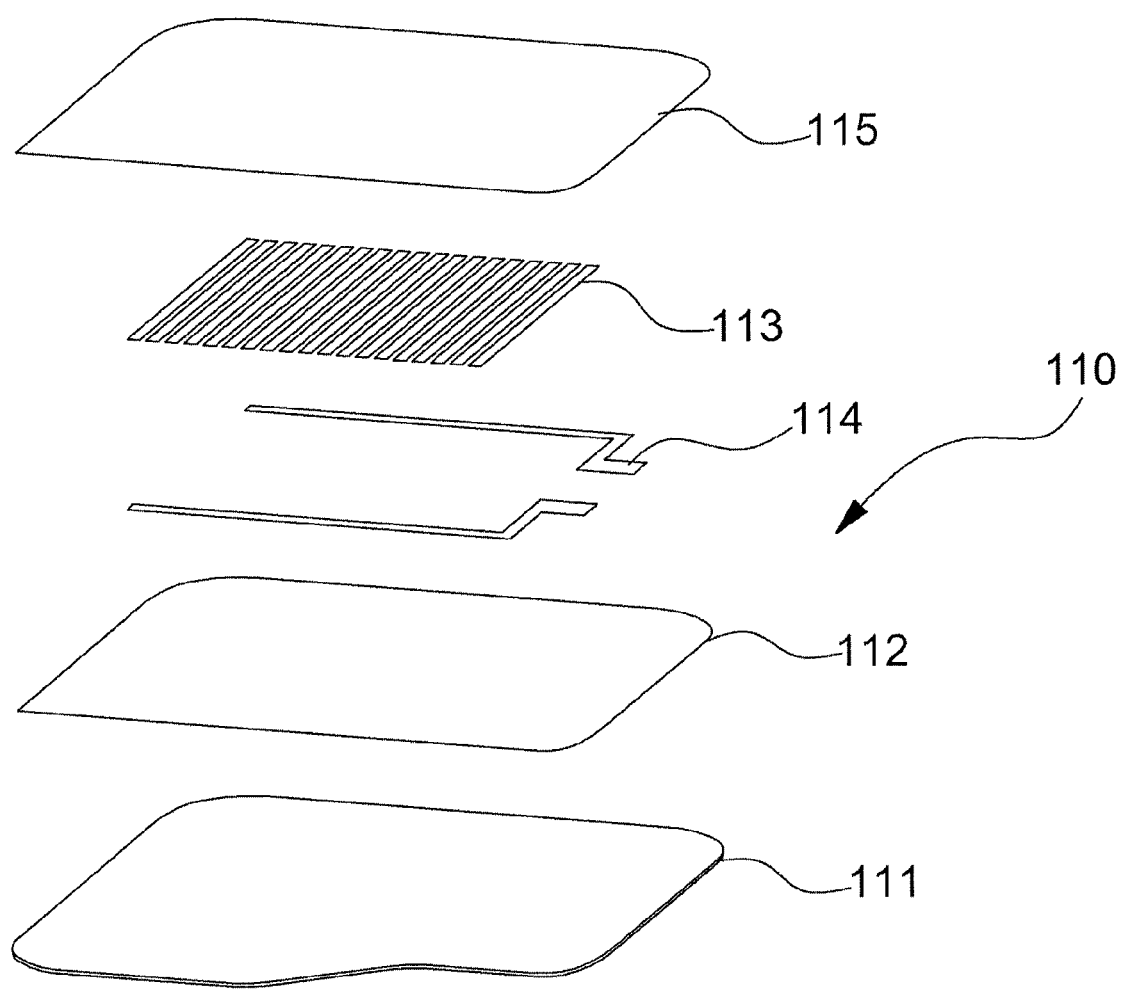
FIG. 6 is an exploded-perspective view illustrating a plate-type heater according to an exemplary embodiment of the present invention.

Here, the plate-type heater 110, as shown in FIG. 6, includes a plate-type base member 111, a lower insulation layer 112 laminated on the base member 111, a heating body 113 that is patterned to be thin and long and laminated over the lower insulation layer 112, an electrode 114 for applying external electric power to the patterned-heating body 113 and an upper insulation layer 115 that is laminated over the heating body 113 and the electrode 114.

The base member 111 becomes a base material serving as a supporter for supporting the heating body 113 and the electrode 114 and it may be made of metal such as stainless steel or synthetic resin and further insulation material is coated on an upper surface of the base member 111 to form the lower insulation layer 112.

Figure 7:
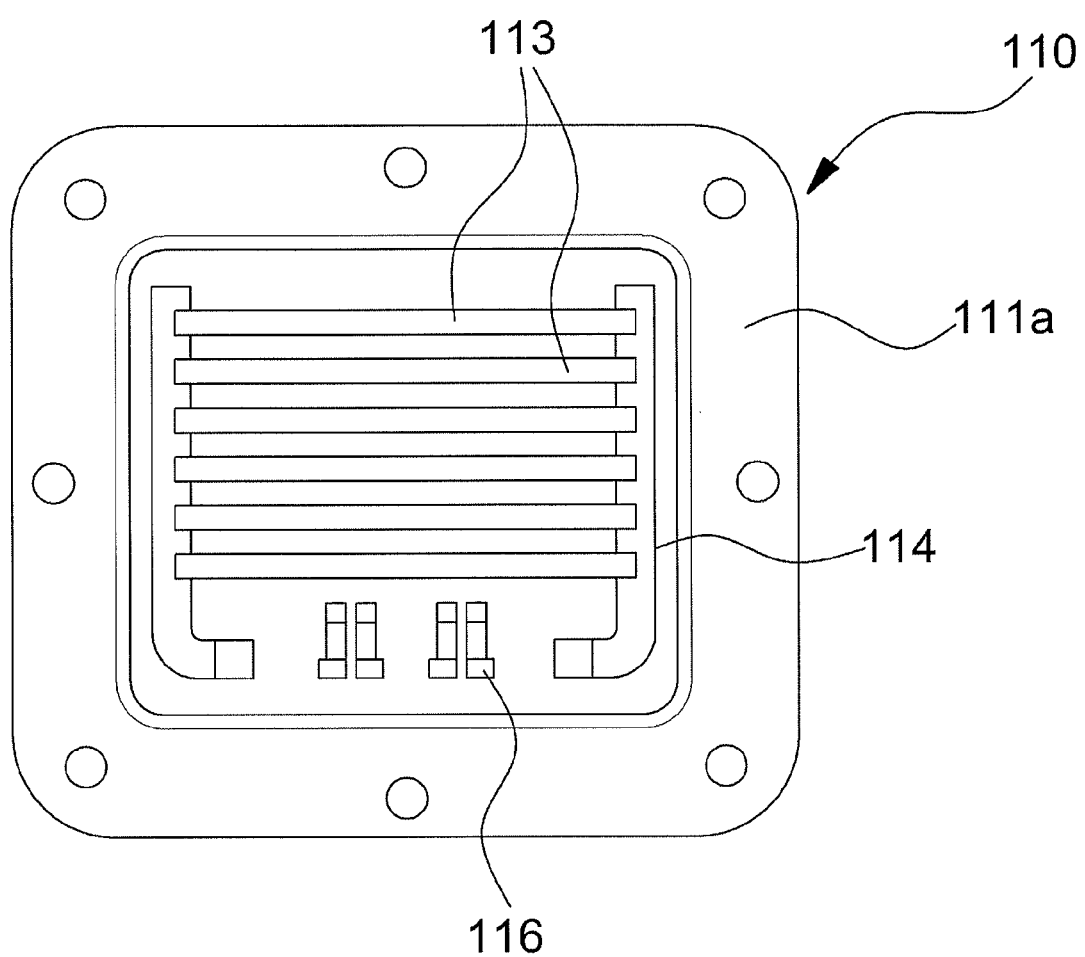
FIG. 7 is a flat view illustrating a patterned-heating body and electrode of a plate-type heater according to an exemplary embodiment of the present invention.

FIG. 7 is a flat view illustrating a plate-type heater according to an exemplary embodiment of the present invention, wherein a plurality of heating bodies 113 that are patterned to be thin and long are arranged laterally at a predetermined interval on the lower insulation layer 112 and the electrodes 114 are arranged extending longitudinally to be connect commonly to both ends of the patterned-heating body 113.

With respect to configuring the plate-type heater 110, as illustrated in the exemplary embodiment, a plurality of heating bodies 113 that are thin and long are arranged evenly throughout the entire area of the heater at a predetermined interval, thereby making heating area thereof large and not concentrating heat on a specific portion by decreasing the degree of heat integration.

A connector 117 for electric power is connected to the electrode 114 through a wire and when electric power is applied to the heating body 113 through the connector 117 and the electrode 114 in accordance with control signal from a controller, the heating body 113 is operated to heat washer liquid.

The upper insulation layer 115 is formed over the patterned-heating body 113 and the electrode 114 by coating insulation material.

The reference numeral 116 in FIG. 7 refers to a connection terminal for a thermistor that is attached for detecting temperature of the heater 110 including the heating body 113, the connection terminal 116 is connected to a connector for the thermistor 118 through a wire, and a controller is connected to the connector for thermistor 118 through a wire.

As a result, the controller controls an operational electric power for the heater, that is, the electric power that is applied to the heating body 113 in accordance with temperature of the heater 110 that is detected by a thermistor, and basically, it applies electric power to operate the heater 110 when a driver operates an operational switch (washer switch) to inject washer liquid, and it turns off the heater by cutting off electric power when the heater 110 is over-heated to a reference temperature or more.

The protect cover 120 is assembled to protect the heater 110 by covering a lower part thereof wherein a flange 121 is formed to be protruded along a surrounding of an opened-upper surface thereof while it has an inner space with a predetermined volume.

At this time, as illustrated in the exemplary embodiment, the connector for electric power 117 and the connector for thermistor 118 are fixed to the protect cover 120, wherein the connector for electric power 117 is fixed to a left lower surface of the protect cover 120 and in this case the wire connected to the connector for electric power 117 passes through the protect cover 120 to be connected to the electrode 114 of the heater 110.

Further, the connector for thermistor 118 is assembled for itself to pass through the protect cover 120 and is connected to the connection terminal for thermistor 116 of the heater 110 through a wire within the protect cover 120 as well.

As described above, the heater assembly 109 configured by assembling together the connector for electric power 117, the connector for thermistor 118, and wires is fastened and fixed to the auxiliary tank 101 by using bolt of fastening device.

A flange 111a is formed to be protruded along a surrounding portion of the heater 110, more precisely, a surrounding portion of the base member 111 to fix the heater assembly 109, which is bolt-fastened while it is bonded to the flange 121 of the protect cover 120.

As a result, the bonded portion is fastened to a surrounding portion of the hole 103a of the auxiliary tank 101 using bolts of fastening device while the flange 111a of the heater 110 and the flange 121 of the protect cover 120 are bonded, thereby fixing the heater 110 and the protect cover 120.

Preferably, a waterproof pad 130 may be interposed between the flange 111a of the heater 110 and the flange 121 of the protect cover 120 to be bonded, and between the flange 111a of the heater 110 and the bonded portion of the auxiliary tank 101 to prevent leakage of washer liquid.

As described above, an upper surface of the heater 110 in the fixed heating device 100 is exposed to the inside of the auxiliary tank 101 so that the heater 110 can heat directly washer liquid.

Eventually, when the heating device of washer liquid according to an exemplary embodiment of the present invention is applied, the washer liquid stored in a reservoir is heated directly so that the problems caused from viscosity increase of washer liquid under low temperature, that is, a decline of discharging pressure of a washer pump, a poor supply of washer liquid and a poor landing location of washer liquid, a poor cleaning of glass, damages to a washer pump and an operation switch and the like can be improved.

According to the heating device of washer liquid of the present invention, it is installed integrally to a reservoir such that the washer liquid within an auxiliary tank to which a washer pump is installed is heated directly by a plate-type heater so that the problems caused from viscosity increase of washer liquid under low temperature, that is, a decline of discharging pressure of a washer pump, a poor supply of washer liquid and a poor landing location of washer liquid, a poor cleaning of glass, damages to a washer pump and an operation switch and the like can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A washer liquid heating apparatus integrated into a reservoir, comprising:
   an auxiliary tank which is integrally connected to the reservoir and in which a washer liquid inflowing from the reservoir is stored;
   a heater assembly that is integrally attached to the auxiliary tank and heats the washer liquid stored in the auxiliary tank,
      wherein the heater assembly comprises a plate-type heater that is installed in a hole of the auxiliary tank to heat the washer liquid within the auxiliary tank, and
      wherein the plate-type heater is exposed to an inside of the auxiliary tank through the hole of the auxiliary tank such that a heating surface where heating is performed heats the washer liquid within the auxiliary tank,
      wherein an input port to be fitted into a hole formed on a lower part of the reservoir is formed on an upper part of the auxiliary tank, and
      wherein a height of the input port is lower than a top height of the reservoir, so that the washer liquid within the reservoir inflows into the auxiliary tank and is filled therein due to a pressure difference between the auxiliary tank and the reservoir,
   a protect cover that is assembled onto the auxiliary tank to surround the plate-type heater; and
   a fastening device for fixing the plate-type heater and the protect cover to the auxiliary tank,
      wherein a flange of the heater is formed to be protruded along a surrounding of the plate-type heater, and the flange of the heater is bonded to a protect cover flange of the protect cover.

2. The washer liquid heating apparatus integrated into the reservoir of claim 1,
   wherein the fastening device is a bolt for fastening a bonded portion of the flange of the plate-type heater and the protect cover flange while the flange of the plate-type heater, the protect cover flange and a surrounding portion of the hole of the auxiliary tank are bonded.

3. The washer liquid heating apparatus integrated into the reservoir of claim 2, wherein a waterproof pad is interposed between the flange of the plate-type heater and the protect cover flange to be bonded, and between the flange of the plate-type heater and a surrounding portion of the hole of the reservoir to prevent leakage of the washer liquid.

4. The washer liquid heating apparatus integrated into the reservoir of claim 1, wherein the plate-type heater comprises:
   a plate-type base member;
   a lower insulation layer laminated on the base member;
   a plurality of heating bodies laminated over the lower insulation layer;
   an electrode for applying external electric power to the plurality of heating bodies; and
   an upper insulation layer that is laminated over the plurality of heating bodies and the electrode,
   wherein the plurality of heating bodies formed to be long over the lower insulation layer are arranged at a predetermined interval to be patterned.

5. The washer liquid heating apparatus integrated into the reservoir of claim 1, wherein the hole of the auxiliary tank to which the heater is installed is formed on a bottom or a floor of the auxiliary tank at which the washer liquid within the auxiliary tank is continuously remained.

6. The washer liquid heating apparatus integrated into the reservoir of claim 1, wherein a washer pump is connected to the auxiliary tank and the washer liquid stored in the auxiliary tank is drawn by the washer pump and then press-transferred through washer hose by an injection nozzle.

7. The washer liquid heating apparatus integrated into the reservoir of claim 6, wherein the hole of the auxiliary tank to which the heater is installed is formed at a position that is lower than a position where the washer liquid is drawn by the washer pump.

* * * * *